US005653263A

United States Patent [19]

Killing

[11] Patent Number: 5,653,263

[45] Date of Patent: Aug. 5, 1997

[54] BUBBLE STORING DEVICE WITH BUBBLE HAVING DIFFERENT ZONES

[75] Inventor: Bernd Killing, Erkrath, Germany

[73] Assignee: Robert Bosch GmbH, Stuttgart, Germany

[21] Appl. No.: 764,492

[22] Filed: Oct. 15, 1991

[30] Foreign Application Priority Data

Nov. 10, 1990 [DE] Germany .......................... 40 35 785.6

[51] Int. Cl.[6] .................................................... F16L 55/04

[52] U.S. Cl. ................................ 138/30; 138/26; 220/403

[58] Field of Search ........................ 138/26, 30; 220/856, 220/403; 417/540

[56] References Cited

U.S. PATENT DOCUMENTS 3,067,776 12/1962 Love ........................................ 138/30

3,376,898 4/1968 Hugley ........................................ 138/30

3,946,759 3/1976 Mercier ........................................ 138/30

*Primary Examiner*—David Scherbel

*Assistant Examiner*—James F. Hook

*Attorney, Agent, or Firm*—Michael J. Striker

[57] ABSTRACT

A bubble storing device for storing a liquid under pressure has a container having an interior, a bubble composed of an elastic material and located in the container so as to subdivide the interior into a liquid chamber and a gas chamber, a gas valve and a liquid valve provided in the container and associated with a respective one of the zones. The bubble has at least two zones located one after the other in a longitudinal direction of the bubble and composed of different material, the zones including a first zone which is associated with the gas valve and composed of a material which is substantially insensitive to thermal loads, and a second zone which is associated with the liquid valve and composed of a material which is substantially insensitive to mechanical loads.

18 Claims, 2 Drawing Sheets

11
13
-15A-
-15B-
10
15
-15C-
14
12

BUBBLE STORING DEVICE WITH BUBBLE HAVING DIFFERENT ZONES

BACKGROUND OF THE INVENTION

The present invention relates to bubble storing device. More particularly, it relates to such a bubble storing device which has a rigid container with a gas valve and a liquid valve and an elastic bubble located in the interior of the container and subdividing the interior into a gas chamber and a liquid chamber.

Bubble storing devices of the above mentioned general type are known in the art. The bubble which forms an elastic partition and subdivides the interior of the pressure container into the gas chamber and the liquid chamber is usually filled with a neutral gas, for example, nitrogen with a predetermined pretensioning. The volume of the gas chamber reduces under pressure of the liquid which enters the liquid chamber. The withdrawal of the liquid is performed under the action of the gas pressure. The walls of the bubble for separating the gas chamber and the liquid chamber are subjected to different loads and therefore have different stresses to withstand, for example they have to have different temperature resistance, high region of temperature to be used, low gas permeability, squeezing, shearing and expansion strength, wear strength. The material must withstand chemical loads without being destroyed or swollen beyond permissible levels. At the maximum operational temperature the material must not weaken or harden and at the minimum operational temperature it must be sufficiently flexible. The known bubble storing devices with single-layer or multi-layer bubble walls are composed of a single material or a uniform material combination. The selection of the material of the material combination is always a compromise in view of the different types of loads applied to the individual bubble regions. The utilized materials are for example acrylnitrile-butadiene-rubber (NBR), epichlorohydrine-rubber (ECO), butyl-rubber (IIR), fluoro-rubber (FKM), fluoro-silicon-rubber (FVMQ).

SUMMARY OF THE INVENTION

Accordingly, it is an object of the present invention to provide a bubble storing device which avoids the disadvantages of the prior art.

More particularly, it is an object of the present invention to provide a bubble storing device in which a bubble operating as a partition is formed so as to satisfy almost ideally the different loads in the different areas of the bubble.

In keeping with these objects and with others which will become apparent hereinafter, one feature of the present invention resides, briefly stated, in a bubble storing device which includes a container and an inner bubble subdividing the container into a gas chamber and a liquid chamber, wherein the bubble has at least two zones arranged one behind the other in a longitudinal direction and composed of different materials, wherein a zone associated with a gas valve is composed of a material which is substantially insensitive to thermal loads, while a zone located adjacent to a liquid valve is composed of material which is substantially insensitive to mechanical loads.

When the bubble storing device is designed in accordance with the present invention, it eliminates the disadvantages of the prior art and provides for the above specified advantages. More particularly, it satisfies the requirements to withstand different loads in different regions of the bubble. Such a bubble storing device is characterized by a high degree of tightness and a long service life.

In accordance with another feature of the present invention a third zone is arranged between the two first mentioned zones and composed of a material which has a substantially low gas permeability.

The bubble can be composed at least partially of a multi-layer material.

In accordance with further features of the present invention, the zones of the bubble can have the same basic component but different mixing ratios so that each zone is adjusted to respective loads.

On the other hand the zones of bubble can be composed of materials which, with additional respective additives, are adjusted to the respective loads in the respective zones.

The zones associated with the gas valve can be composed of fluoro-rubber (FKM), fluoro-silicon-rubber (FVMQ), silicon-rubber (VMQ), acrylonitrile-butadiene-rubber (NBR)..

The third or central zone can be composed of fluoro-rubber (FKM), butyl-rubber (IIR), epichlorohydrin-rubber (ECO), acrylonitrile-butadiene-rubber (NBR).

Finally, the zone associated with the liquid valve can be composed of polyurethane (AU) and acrylnitrile-butadiene-rubber (NBR).

DESCRIPTION OF THE PREFERRED EMBODIMENT

Figure 1:
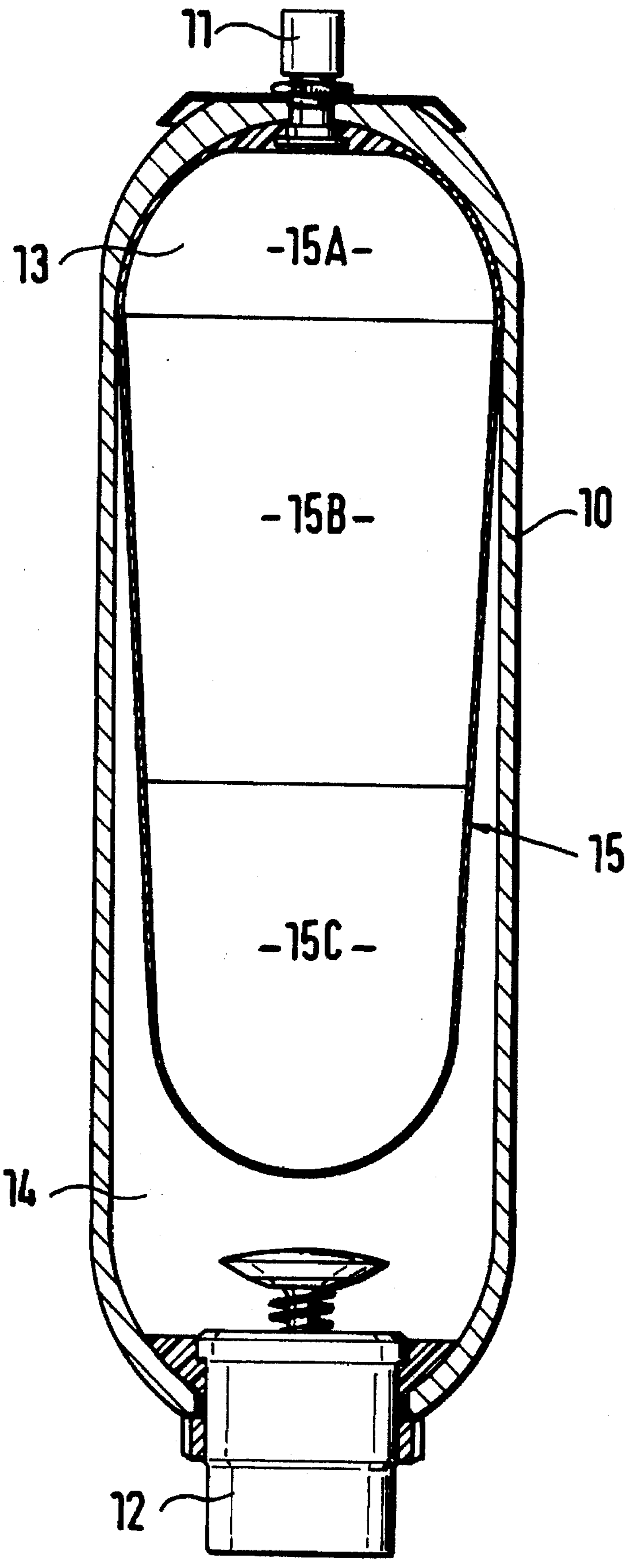
FIG. 1 of the drawing is a view which schematically shows a bubble storing device in accordance with the present invention.

A bubble storing device shown in FIG. 1 has a cylindrical steel container 10 with rounded upper and lower portions. A gas valve 11 is arranged in the upper portion of the container. A liquid valve 12 is arranged in the lower portion of the container. The construction and the operation of the valves are generally known and therefore they are not described in detail.

The interior of the container includes a gas chamber 13 and a liquid chamber 14. The chambers 13 and 14 are separated from one another by a bubble 15 which is composed of an elastic material. The bubble 15 is mounted in a known manner on the gas valve 11. The bubble in accordance with the present invention has three zones 15A, 15B, 15C, namely the upper zone 15A, the central zone 15B and the lower zone 15C. The zones are composed of different materials, and correspond to two main loads or main requirements.

In the upper zone 15A the temperature load of the material of the bubble is the greatest. Therefore, here a material or a material mixture is used which is insensitive to high temperatures the greatest, and has a widest temperature region for its use. This material can be for example fluoro—rubber (FKM), fluoro-silicon-rubber (FVMQ) or silicon-rubber (VMQ). Furthermore, also an acrylonitrile-butadiene-rubber (NBR) can be used, which can be adjusted to the occurring temperature loads by respective determination of its mixing ratio and/or the addition of suitable additives.

In the lower zone 15C the mechanical loading of the bubble by squeezing and the alternating contact with the inner wall of the pressure container 10 is the greatest. In this zone, a material or material mixture is used which has high expansion, shearing and squeezing strength as well as high wear resistance. The material used in this zone can be for example polyurethane (AU) or acrylontrile-butadiene-rubber (NBR).

In the central zone 15B the mechanical and thermal loads act on the bubble wall as a background effect so that the requirements for the gas impermeability are the greatest. In this zone, the bubble is composed of a material or material mixture with low gas permeability, for example fluoro-rubber (FKM), epichlorhydrine-rubber (ECO). Also, in both latter mentioned zones a single material can be used, for example an acrylonitrile-butadiene-rubber (NBR) by respective determination of its mixing ratio and/or the addition of special additives in corresponding with the occurring mechanical loads or the requirement of the especially high gas tightness.

Due to the construction of the bubble composed of several zones of different material or material mixtures which are specific to respective loads, the disadvantages of a compromise solution in the prior art with respect to the uniform material composition are avoided, which is selected in a mixing form with respect to the different load forms.

Figure 2:
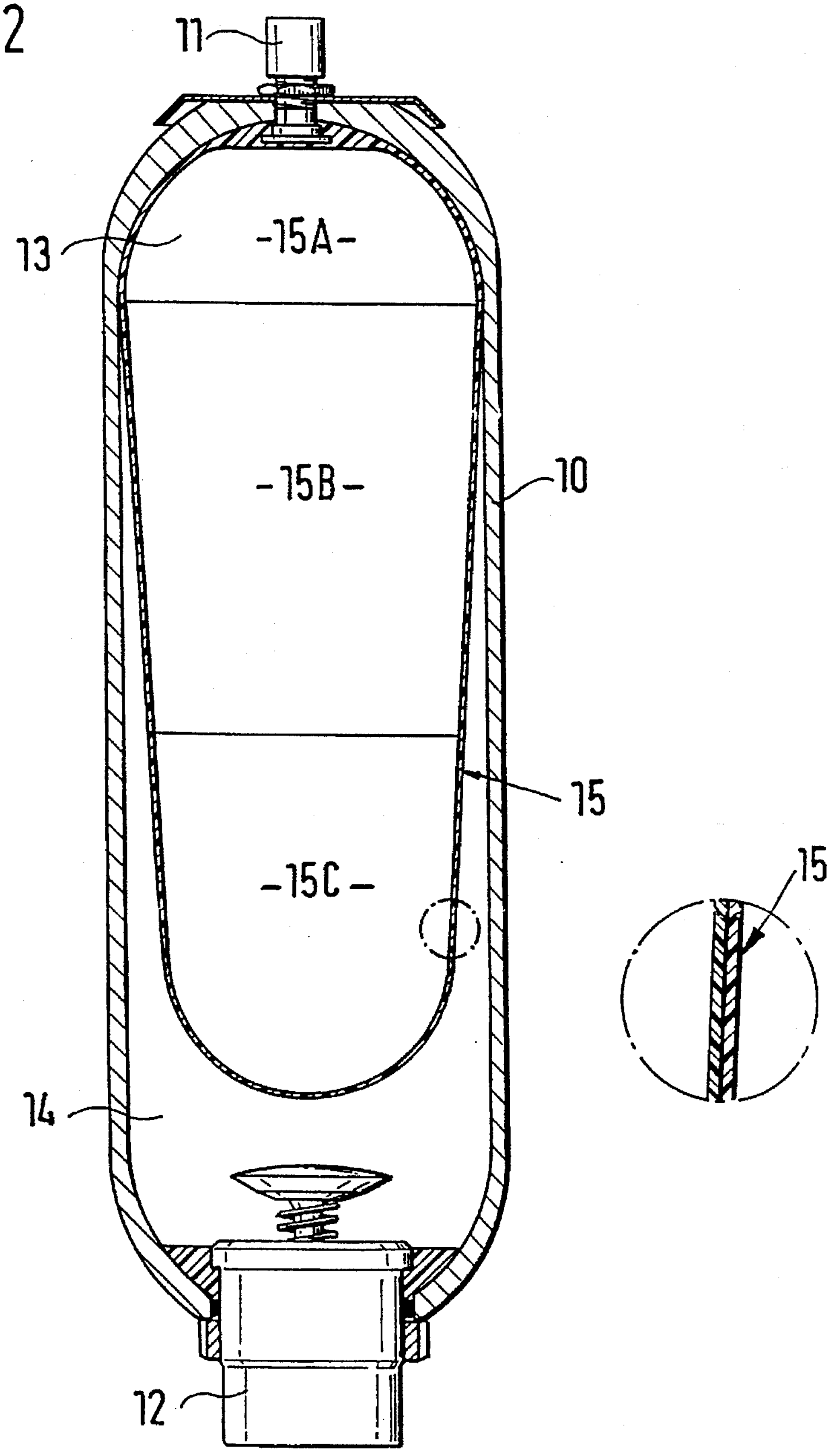
FIG. 2 is a view showing a cross-section of a bubble of the inventive bubble storing device in an encircled area of FIG. 1.

The bubble 15 can be composed of several layers as shown in FIG. 2.

It will be understood that each of the elements described above, or two or more together, may also find a useful application in other types of constructions differing from the types described above.

While the invention has been illustrated and described as embodied in a bubble storing device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A bubble storing device for storing a liquid under pressure, comprising a container having an interior; a bubble composed of an elastic material and located in said container so as to subdivide said interior into a liquid chamber and a gas chamber; a gas valve and a liquid valve provided in said container and associated with a respective one of said chambers, said bubble having at least two zones located one after the other in a longitudinal direction of said bubble and composed of different material, said zones including a first zone which is associated with said gas valve and composed of a material which is substantially insensitive to thermal loads, and a second zone which is associated with said liquid valve and composed of a material which is substantially insensitive to mechanical loads.

2. A bubble storing device as defined in claim 1, wherein said container is formed as a steel container.

3. A bubble storing device as defined in claim 1, wherein said gas valve is arranged in an upper part of said container and said liquid valve is arranged in the lower part of said container.

4. A bubble storing device as defined in claim 1, wherein said bubble further has a third zone which is located between said first and second zones and composed of a material having a substantially low gas permeability.

5. A bubble storing device as defined in claim 1, wherein said bubble at least partially is formed as a multilayer bubble.

6. A bubble storing device as defined in claim 1, wherein said zones have a single basic component with different mixing ratios so as to adjust the material of said zones to be insensitive to the thermal loads and the mechanical loads, respectively.

7. A bubble storing device as defined in claim 1, wherein said zones of said bubble are composed of materials which by addition of additives are adjusted to be insensitive to the thermal loads and the mechanical loads respectively.

8. A bubble storing device as defined in claim 1, wherein said upper zone of said bubble is composed of fluoro-rubber (FKM).

9. A bubble storing device as defined in claim 1, wherein said first zone of said bubble is composed of fluoro-silicon-rubber (FVMQ).

10. A bubble storing device as defined in claim 1, wherein said first zone of said bubble is composed of silicon-rubber (VMQ).

11. A bubble storing device as defined in claim 1, wherein said first zone of said bubble is composed of acrylonitrile-butadiene-rubber (NBR).

12. A bubble storing device as defined in claim 4, wherein said third zone of said bubble is composed of fluoro-rubber (FKM).

13. A bubble storing device as defined in claim 4, wherein said third zone of said bubble is composed of butyl-rubber (IIR).

14. A bubble storing device as defined in claim 4, wherein said third zone of said bubble is composed of epichlorohydrin-rubber (ECO).

15. A bubble storing device as defined in claim 4, wherein said third zone of said bubble is composed of acrylonitrile-butadiene-rubber (NBR).

16. A bubble storing device as defined in claim 1, wherein said second zone is composed of polyurethane (AU).

17. A bubble storing device as defined in claim 1, wherein said second zone is composed of acrylonitrile-butadiene-rubber (NBR).

18. A bubble storing device for storing a liquid under pressure, comprising a container having an interior; a bubble composed of an elastic material and located in said container so as to subdivide said interior into a liquid chamber and a gas chamber; a gas valve and a liquid valve provided in said container and associated with a respective one of said chambers, said bubble having at least two zones located one after the other in a longitudinal direction of said bubble and composed of different material, said zones including a first zone which is associated with said gas valve and a second zone which is associated with said liquid valve, said first zone being composed of a material which is more insensitive to thermal loads than said second zone, while said second zone is composed of a material which is more insensitive to mechanical loads than said first zone.

* * * * *